United States Patent
Jung et al.

(10) Patent No.: US 8,860,813 B2
(45) Date of Patent: *Oct. 14, 2014

(54) METHOD FOR POSE INVARIANT FINGERPRINTING

(71) Applicant: SRI International, Menlo Park, CA (US)

(72) Inventors: Sang-Hack Jung, Jersey City, NJ (US); Ajay Divakaran, Monmouth Junction, NJ (US); Harpreet Singh Sawhney, West Windsor, NJ (US)

(73) Assignee: SRI International, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/711,220

(22) Filed: Dec. 11, 2012

(65) Prior Publication Data
US 2013/0114856 A1     May 9, 2013

Related U.S. Application Data

(63) Continuation of application No. 12/758,507, filed on Apr. 12, 2010, now Pat. No. 8,330,819.

(60) Provisional application No. 61/168,701, filed on Apr. 13, 2009.

(51) Int. Cl.
*H04N 7/18*     (2006.01)

(52) U.S. Cl.
USPC .......................... 348/161; 382/215; 382/219

(58) Field of Classification Search
CPC .. G06K 9/6214; G06K 9/6215; G06T 7/0022; G06T 7/0051; G06T 3/0093
USPC .......................... 382/171, 215, 219
See application file for complete search history.

(56) References Cited

U.S. PATENT DOCUMENTS

| | | | |
|---|---|---|---|
| 6,418,424 | B1 | 7/2002 | Hoffberg et al. |
| 2006/0114359 | A1 | 6/2006 | Chang et al. |
| 2010/0226582 | A1 | 9/2010 | Luo et al. |
| 2011/0013836 | A1* | 1/2011 | Gefen et al. .................. 382/171 |

OTHER PUBLICATIONS

D. G. Lowe, "Distinctive Image Features From Scale-Invariant Keypoints," IJCV, 60(2): pp. 1-28, 2004.

(Continued)

*Primary Examiner* — Dustin Nguyen
(74) *Attorney, Agent, or Firm* — Moser Taboada

(57) ABSTRACT

A computer-implemented method for matching objects is disclosed. At least two images where one of the at least two images has a first target object and a second of the at least two images has a second target object are received. At least one first patch from the first target object and at least one second patch from the second target object are extracted. A distance-based part encoding between each of the at least one first patch and the at least one second patch based upon a corresponding codebook of image parts including at least one of part type and pose is constructed. A viewpoint of one of the at least one first patch is warped to a viewpoint of the at least one second patch. A parts level similarity measure based on the view-invarient distance measure for each of the at least one first patch and the at least one second patch is applied to determine whether the first target object and the second target object are the same or different objects.

20 Claims, 14 Drawing Sheets

(56) References Cited

OTHER PUBLICATIONS

N. Dalal and B. Triggs "Histograms Of Oriented Gradients For Human Detection," Proc. IEEE Conl. on Compo Vision and Patl. Recog., pp. 1-8, Washington, DC, USA, 2005, IEEE Computer Society.

K. Mikolajczyk and C. Schmid, "Scale & Affine Invariant Interest Point Detectors," IJCV, 60(1 ):63-86,2004.

R. Fergus, P. Perona, and A. Zisserman, "Object Class Recognition By Unsupervised Scale-Invariant Learning," CVPR, vol. 2, pp. 1-8, Jun. 2003.

M. Fritz, B. Leibe, B. Caputo, and B. Schiele, "Integrating Representative And Discriminant Models For Object Category Detection," ICCV, vol. 2, pp. 1-8 Oct. 2005.

J. Liebelt, C. Schmid, and K. Schertler, "Viewpoint Independent Object Class Detection Using 3D Feature Maps," CVPR, pp. 1-8, Jun. 2008.

Y. Guo, Y. Shan, H. Sawhney, and R. Kumar, "Peel: Prototype embedding and embedding transition for matching vehicles over disparate viewpoints," CVPR, pp. 1-8, Jun. 2007.

S. Savarese and L. Fei-Fei, "3D Generic Object Categorization, Localization And Pose Estimation," CVPR, pp. 1-8, Oct. 2007.

A. Ashraf, S. Lucey, and T. Chen, "Learning Patch Correspondences For Improved Viewpoint Invariant Face Recognition," CVPR, pp. 1-8, Jun. 2008.

D. Pramadihanto, H. Wu, and M. Yachida, "Face Recognition From A Single View Based On Flexible Neural Network Matching," Robot and Human Communication, 5th IEEE International Workshop on, pp. 329-334, Nov. 1996.

S. Lucey and T. Chen, "Learning Patch Dependencies For Improved Pose Mismatched Face Verification," CVPR, pp. 1-7, Jun. 2006.

L. K. Saul, S. T. Roweis, and Y. Singer, "Think Globally, Fit Locally: Unsupervised Learning Of Low Dimensional Manifolds," Journal of Machine Learning Research, 4: pp. 119-155, 2003.

\* cited by examiner

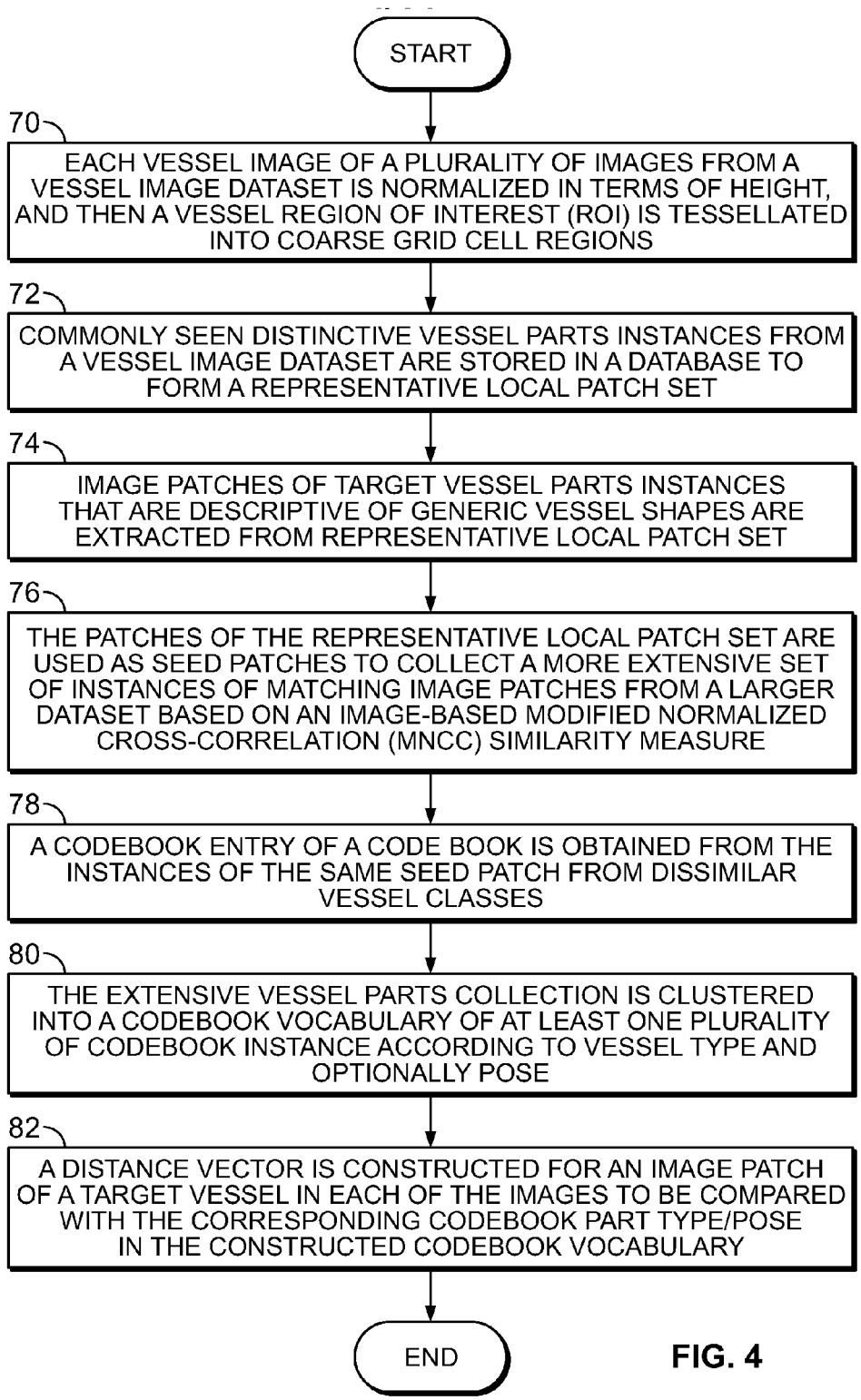

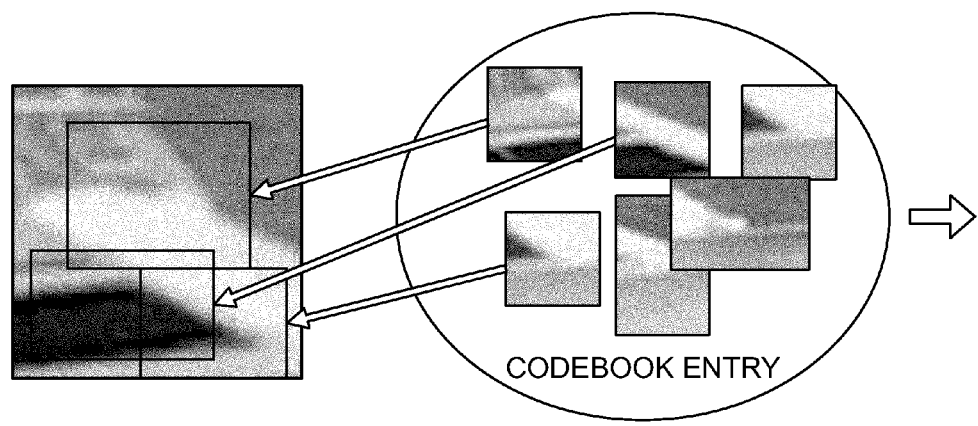
FIG. 8A
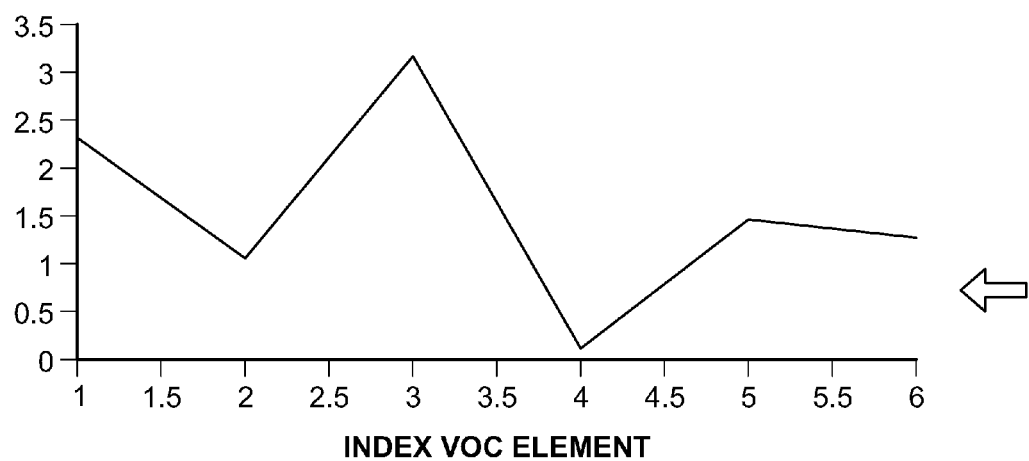
INDEX VOC ELEMENT
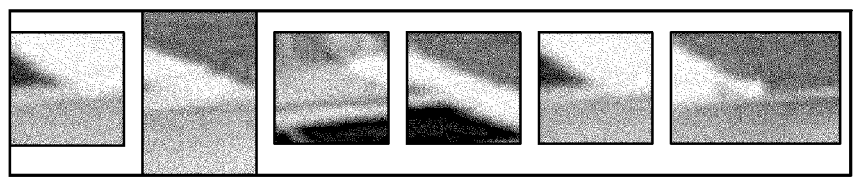
FIG. 8D

FIG. 12
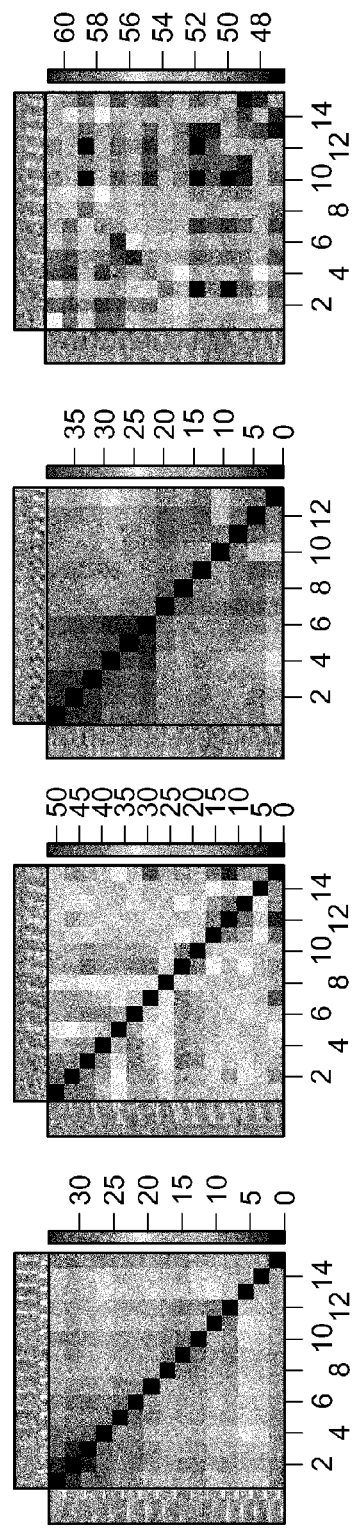
FIG. 13D
FIG. 13C
FIG. 13B
FIG. 13A

METHOD FOR POSE INVARIANT FINGERPRINTING

CROSS-REFERENCE TO RELATED APPLICATIONS

This application is a continuation of U.S. patent application Ser. No. 12/758,507 filed Apr. 12, 2010 (which issued as U.S. Pat. No. 8,330,819 on Dec. 11, 2012), which claims the benefit of U.S. Provisional Patent Application 61/168,701 filed Apr. 13, 2009, both of which are incorporated herein by reference in their entireties.

GOVERNMENT RIGHTS IN THIS INVENTION

This invention was made with U.S. government support under contract number N68335-07-C-0500. The U.S. government has certain rights in this invention.

FIELD OF THE INVENTION

The invention relates generally to computer vision methods. More specifically, the invention relates to a method for viewpoint-invariant object identification, matching, and fingerprinting using low dimensional feature representations and modeling of warping functions in the low-dimensional space.

BACKGROUND OF THE INVENTION

Port security is an important component of homeland security for guarding against terror threats. For instance, a vessel may be carrying explosives or may harbor purported terrorists. There is therefore a need for visual monitoring and identification of vessels nearing ports and navigable rivers.

In the past, substantially large vessels, such as tankers and enemy ships, have been detected using ground based radar and/or land-based optical or infrared cameras. Unfortunately, small vessels pose a greater security threat than large vessels, since small vessels frequently do not have on-board radar ID systems. Such small vessels need to be tracked in an uninterrupted manner, and live and forensic events need to be detected. As a result, there is a further need in the art for effective detection and tracking of small and large vessels, vessel fingerprinting, and cross-camera association and handoff.

One type of technique employed in the prior art computer vision arts for detecting and tracking moving or still objects is viewpoint-invariant object matching. As used herein, the term "viewpoint-invarient" pertains to refers to the same or different object viewed using the same or different cameras either in still images over time with the same or different cameras in which the object being matched or tracked between images may have different poses relative to each other. The object being tracked may have a small or large amount of tilt, orientation, or scaling differences relative to the same object from one image to another, i.e., different points of view. Prior art viewpoint-invariant object matching methods and system have been configured to adopt 3D models in matching procedures to provide pose-invariant distance measures by applying pose-invariant features such as scale-invariant feature transform (SIFT), by dividing pose space, and by handling SIFT features with pose-specific recognizers.

Compared with other object categories, however, (small) vessel identification presents a number of challenges to applying the aforementioned prior art pose-invariant matching approach. There are a relatively large number of different types of vessels with unique designs. There is a high degree of variation in vessel size, motion, and shape. Under viewpoint changes due to wakes, waves, etc., it is difficult to obtain stable images. In addition, vessels are typically observed from a large distance so that truthful 3D reconstruction is not available in practice, thereby limit the applicability of prior art 3D model-based pose inference or matching methods. Additional difficulties arise when vessels are observed over a large dynamic range of viewpoints, typically far away from cameras. As a result, there may be insufficient resolution for matching under wide variations in target object appearance due to large scale changes. As opposed to vehicle monitoring applications where target objects stay in confined viewpoints, individual vessels may take arbitrary paths, and are thus captured in a wide variety of poses.

The aforementioned problems with view-invariant object matching has been addressed in the vision community with focus on various aspects. At the feature level, there are popular descriptors that possesses scale and rotation invariance such as SIFT, histogram of oriented gradients (HoG) as described in D. G. Lowe, "Distinctive image features from scale-invariant keypoints," IJCV, 60(2):91-110, 2004, in N. Dalal and B. Triggs "Histograms of oriented gradients for human detection," Proc. IEEE Conf. on Comp. Vision and Patt. Recog., pages 886-893, Washington, D.C., USA, 2005, IEEE Computer Society, and affine-invariant interest point detectors as described in K. Mikolajczyk and C. Schmid, "Scale & affine invariant interest point detectors," IJCV, 60(1):63-86, 2004. View invariance in object representation may be obtained by parts based representation where object is represented by a constellation of parts to remove view-dependent geometry as described in R. Fergus, P. Perona, and A. Zisserman, "Object class recognition by unsupervised scale-invariant learning," CVPR, volume 2, pages II-264-II-271 vol. 2, June 2003 and in M. Fritz, B. Leibe, B. Caputo, and B. Schiele, "Integrating representative and discriminant models for object category detection," ICCV, volume 2, pages 1363-1370 Vol. 2, October 2005. Generic descriptors however do not provide sufficient discriminability for refined object matching and often produce very sparse feature sets, which is also the case with parts composition-based matching approaches.

Object variation from pose changes may be removed by employing 3D model-based pose inference and matching as described in J. Liebelt, C. Schmid, and K. Schertler, "Viewpoint independent object class detection using 3d feature maps," CVPR, pages 1-8, June 2008 (hereinafter "Liebert et al.") and in Y. Guo, Y. Shan, H. Sawhney, and R. Kumar, "Peet: Prototype embedding and embedding transition for matching vehicles over disparate viewpoints," CVPR, pages 1-8, June 2007 (hereinafter "Guo et al."). Synthetic 3D object models can provide a very strong cue for resolving pose dependency by discovering partial geometry as described in S. Savarese and L. Fei-Fei, "3d generic object categorization, localization and pose estimation," CVPR, pages 1-8, October 2007 or object pose as described in Guo et al. To obtain discriminability, Liebelt et. al. adopted image-based descriptors for object class detection. Guo et. al. exploits 3D models to obtain view-normalized exemplar distances for pose invariant vehicle matching. View-invariance can be also handled by learning pose dependent object variation. For example, in the face recognition literature, such techniques include actively learning pose-induced variation, by trying to learn patch-based view alignments as described in A. Ashraf, S. Lucey, and T. Chen, "Learning patch correspondences for improved viewpoint invariant face recognition," CVPR, pages 1-8, June 2008, by statistically learning pose-invariant features as described in D. Pramadihanto, H. Wu, and M. Yachida, "Face recognition from a single view based on flexible neural network matching," *Robot and Human Communication, 5th IEEE International Workshop on*, pages 329-334, November 1996, and by distribution of patch deformation space as described in S. Lucey and T. Chen, "Learning patch dependencies for improved pose mismatched face verification, *CVPR*, June 2006.

As opposed to learning warping functions directly in the image space, it is desirable to learn view warping in feature space to maintain better discriminability at the feature level. In this spirit, PEET as described in Guo et al. comes the closest to fulfilling this goal. However, unlike Guo et al., it is additionally desirable to explicitly enforce embedded distances to reside on a smooth surface to simplify the determination of the degree of warping between images having different poses.

Accordingly, what would be desirable, but has not yet been provided, is method for object matching and identification across multiple categories of different versions of the same object type, such as a vessel, under viewpoint changes that overcomes the deficiencies in the aforementioned prior art methods.

SUMMARY OF THE INVENTION

The above-described problems are addressed and a technical solution achieved in the art by providing a method and system for matching objects, the method being executed by at least one processor, comprising the steps of receiving at least two images wherein one of the at least two images has a first target object and a second of the at least two images has a second target object; extracting at least one first patch from the first target object and at least one second patch from the second target object; constructing a distance-based part encoding between each of the at least one first patch and the at least one second patch based upon a corresponding codebook of image parts including at least one of part type and pose; warping a viewpoint of one of the at least one first patch to a viewpoint of the at least one second patch; and applying a parts level similarity measure based on the view-invarient distance measure for each of the at least one first patch and the at least one second patch to determine whether the first target object and the second target object are the same or different objects.

According to an embodiment of the present invention, the codebook of image parts may comprise a set of neighborhood local patches to a distinctive anchor shape, wherein a distance to each codebook entry forms an embedded distance vector utilized as a part encoding. The codebook of image parts may be a subset of a codebook based object representation, comprising a codebook vocabulary of instances of distinctive part types of an object that are characteristic of objects of the same type. The codebook vocabulary may be constructed by: normalizing each image of an object of a plurality of images of objects in terms of height and tesselating a region of interest (ROI) of the object into coarse grid cell regions; extracting commonly seen distinctive parts instances from the plurality of images to form a representative local patch set; designating patches in the representative local patch as seed patches to collect a more extensive set of instances of matching image patches from a larger dataset based on an image-based modified normalized cross-correlation (MNCC) similarity measure; and clustering the extensive set of instances of matching image patches into a codebook vocabulary of at the least one plurality of codebook instances according to object type and pose. Constructing a distance-based part encoding may comprise the step of computing a distance vector for each of the at least one first patch and the at least one second patch based on the Euclidean distance between the HOG representation of the at least one first patch and the at least one second patch and each of the vocabulary elements of a corresponding codebook in the codebook vocabulary.

According to an embodiment of the present invention, the first target object and the second target object may be vessels.

According to an embodiment of the present invention, the step of warping a viewpoint may be based upon a mapping between two jointly constructed low-dimensional manifolds to obtain a view-invariant distance measure in a lower dimensional space. The mapping between two jointly constructed low-dimensional manifolds may be learned through local linear embedding (LLE). LLE may be employed by: detecting at least one matching codebook element for each of the at least one first patch from the first target object and at least one second patch; for each matching codebook element, obtaining a matching codebook element response is obtained and forming a feature vector; and for each formed feature vector, obtaining a K nearest neighborhood from a stored sample dataset; determining a coordinate in a lower-dimensional space using LLE; determining a corresponding warped LLE coordinate; computing a linear reconstruction weight using a non-parametric mapping; and reconstructing a view rectified feature vector in a higher dimensional space based on a weighting of the warped LLE coordinate with the reconstructed weight.

According to an embodiment of the present invention, the parts-level similarity measure may be based on a same-different classifier and on view-rectified distances.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which:

FIG. 4 is a process flow diagram illustrating exemplary steps for representing target objects by a codebook vocabulary that is encoded with an embedded distance measure, i.e., step 62 of FIG. 3 in greater detail, according to an embodiment of the present invention;

FIGS. 5A and 5B are diagrams illustrating a discriminative parts clustering scheme, wherein FIG. 5A depicts a local cell-based parts collection, and FIG. 5B is a graph and set of images of a resulting vocabulary by clustering parts along type and pose space, according to an embodiment of the present invention;

FIGS. 8A-8D illustrate a summary of computational steps for encoding local vessel parts;

FIG. 12 depicts examples of vessel classes having different poses;

FIGS. 13A-13D shows view-rectified global vessel distances between two classes, wherein FIGS. 13A-13C show in-class distance distribution, while FIG. 13D shows distance between different classes.

It is to be understood that the attached drawings are for purposes of illustrating the concepts of the invention and may not be to scale.

DETAILED DESCRIPTION OF THE INVENTION

The main goal of the present invention is to compare at least two objects in at least two different images from the same or different cameras in the same or different location to determine if the at least two objects are the same or different objects. If a match is found, the object may be fingerprinted and subsequently tracked in later captured images. Embodiments of the present invention permit cross-camera association and handoff for uninterrupted tracking of target objects, such as boats/vessels, and for live and forensic event detection for use in, for example, homeland security or drug trafficking interception applications.

Figure 1:
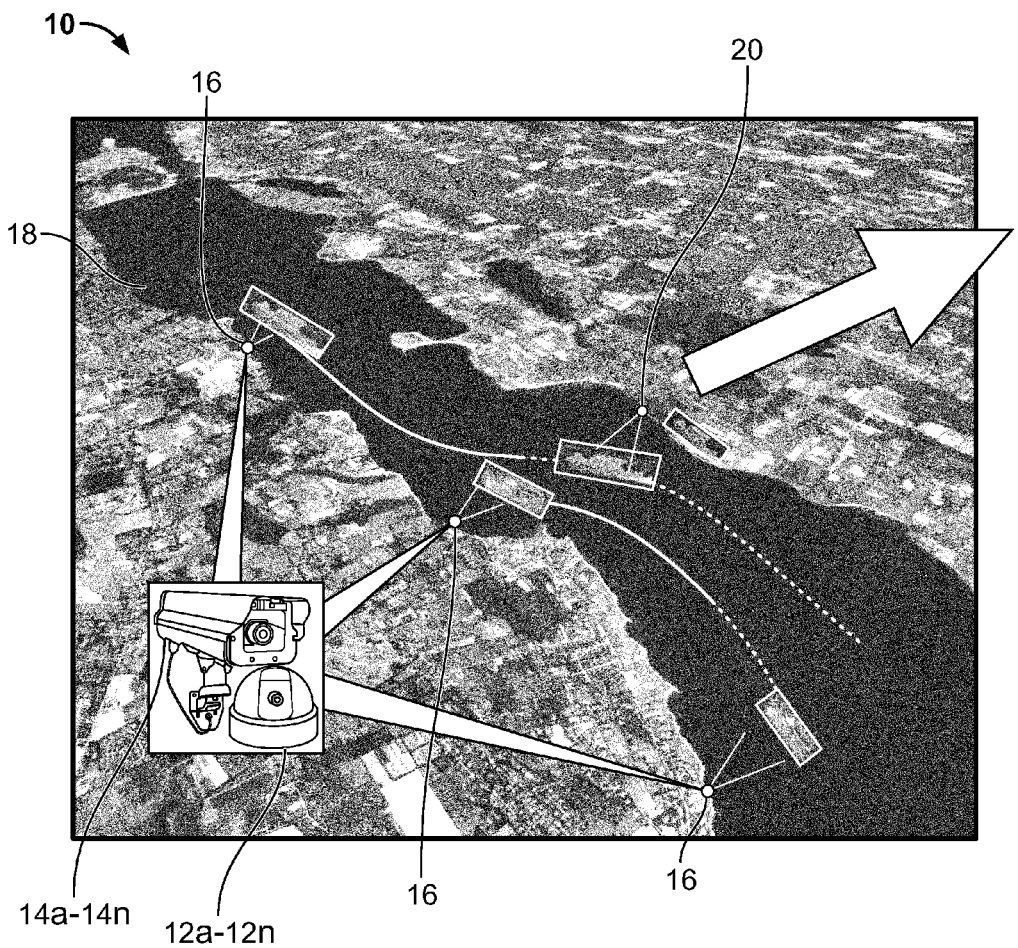
FIG. 1 is a hardware block diagram illustrating a cross-camera association and handoff system, according to an embodiment of the present invention.

FIG. 1 is a hardware block diagram illustrating a cross-camera association and handoff system 10, according to an embodiment of the present invention. A plurality of pairs of wide-angle cameras 12a-12n and pan-tilt-zoom (PTZ) camera 14a-14n may be placed at different locations 16 along a river 18. A suspect vessel 20 may be detected in a wide area by using at least one of the wide-angle cameras 12a. Once detected, a co-located PTZ camera 14a may zoom in on the suspect vessel 20 and identify, fingerprint, and track the suspect vessel 20 using certain embodiments of the method of the present invention. Once the suspect vessel 20 leaves the field of view of the camera 12a, 14a, the system 10 may transfer the operations of identifying, matching, fingerprinting and tracking of the suspect vessel 20 further downstream/upstream using another camera pair 12b, 14b, etc., employing the same embodiments of the method of the present invention.

Note that objects of interest discussed above are vessels. Embodiments of the present invention are most useful in identifying, matching, tracking, and fingerprinting vessels. However, embodiments of the present invention are not limited to vessels. In general, embodiments of the present invention are best applied to any type of object that has distinctive shape differences among pixel patterns in images taken by the same or different cameras. For example, vessels of different types have various shape differences among certain distinctive parts, such as the shapes of sterns, prows, etc., while cars and more so people may have fewer distinct shape differences.

Figure 2:
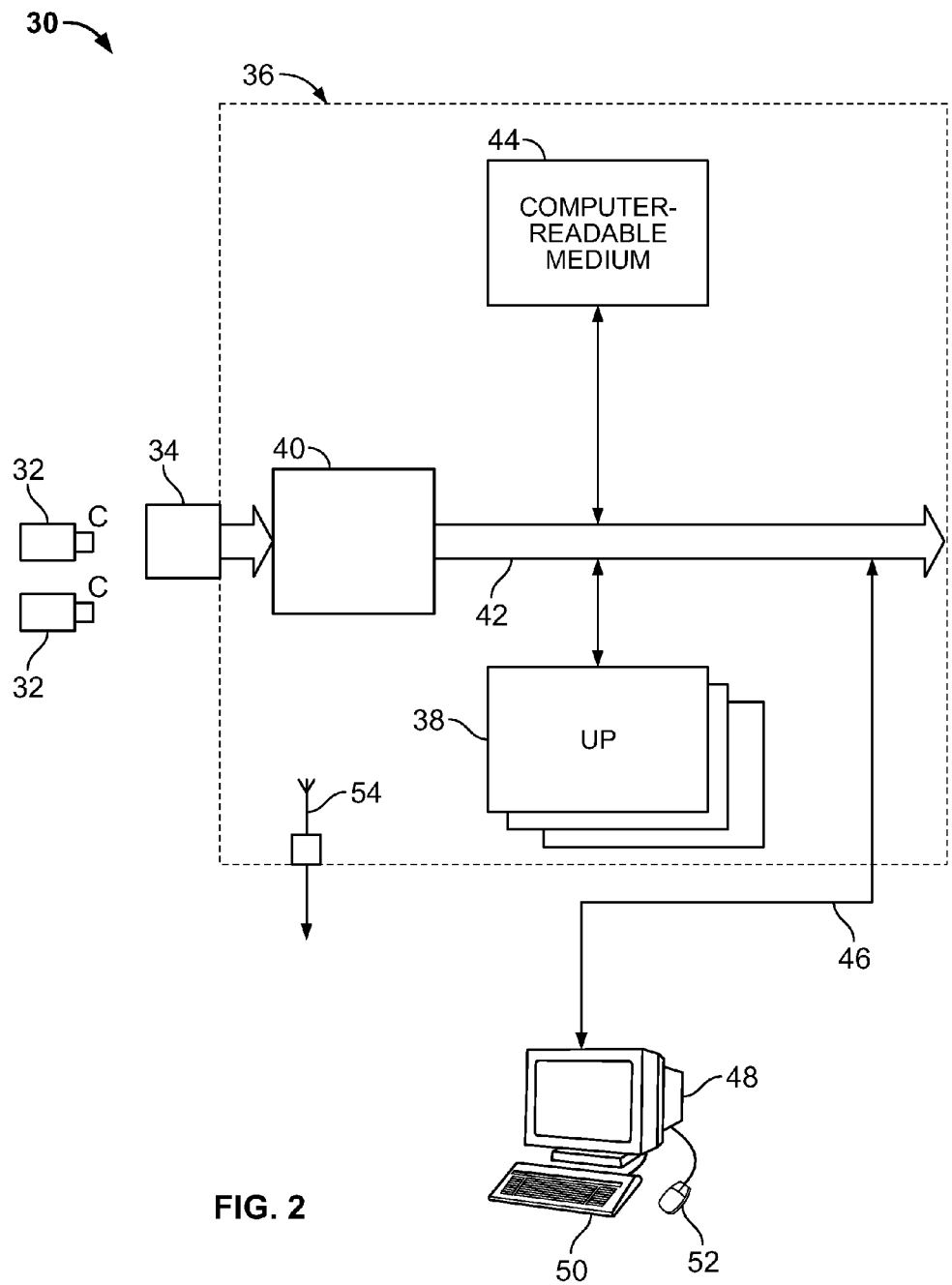
FIG. 2 is an exemplary hardware block diagram illustrating parts of a single module for identifying and matching objects, according to an embodiment of the present invention.

FIG. 2 is an exemplary hardware block diagram illustrating parts of a single module 30 for identifying and matching objects, according to an embodiment of the present invention. By way of a non-limiting example, the module 30 receives digitized video or still images from one or more image capturing devices 32, such as one or more still or video cameras that may be a pair of the wide angle camera 12a-12n and the PTZ camera 14a-14n of FIG. 1. The module 30 may also include a digital video capture system 34 and a computing platform 36. The digital video capturing system 34 processes streams of digital video, or converts analog video to digital video, to a form which can be processed by the computing platform 36. The digital video capturing system 34 may be stand-alone hardware, or cards such as Firewire cards which can plug-in directly to the computing platform 36. According to an embodiment of the present invention, the image capturing devices 32 may interface with the video capturing system 34/computing platform 36 over a heterogeneous datalink, such as a radio link and digital data link (e.g, ethernet). The computing platform 36 may include an embedded computer, a personal computer, or a work-station (e.g., a Pentium-M 1.8 GHz PC-104 or higher) comprising one or more processors 38 which includes a bus system 40 which is fed by video data streams 42 via the one or more processors 38 or directly to a computer-readable medium 44. The computer readable medium 44 may also be used for storing the instructions of the module 30 to be executed by the one or more processors 38, including an operating system, such as the Windows or the Linux operating system. The computer readable medium 44 may further be used for the storing and retrieval of images/video clips of the present invention in one or more databases. The computer readable medium 44 may include a combination of volatile memory, such as RAM memory, and non-volatile memory, such as flash memory, optical disk(s), and/or hard disk(s). Portions of a processed video data stream 46 may be stored temporarily in the computer readable medium 44 for later output to an optional monitor 48. The monitor 48 may display processed video data stream/still images. The monitor 48 may be equipped with a keyboard 50 and a mouse 52 for selecting objects of interest by an analyst.

The module 30 may further be equipped with a wired/wireless interface 54 for communicating in a peer-to-peer fashion with other upstream/downstream modules 30, in which case each of the modules 30 contains program code for the entirety of embodiments of the method of the present invention, or in a slave/master fashion with an optional central controller (not shown) having a similar computer platform architecture with more communication interfaces, in which case the central controller stores code for executing most or all of the embodiments of the method of the present invention.

Figure 3:
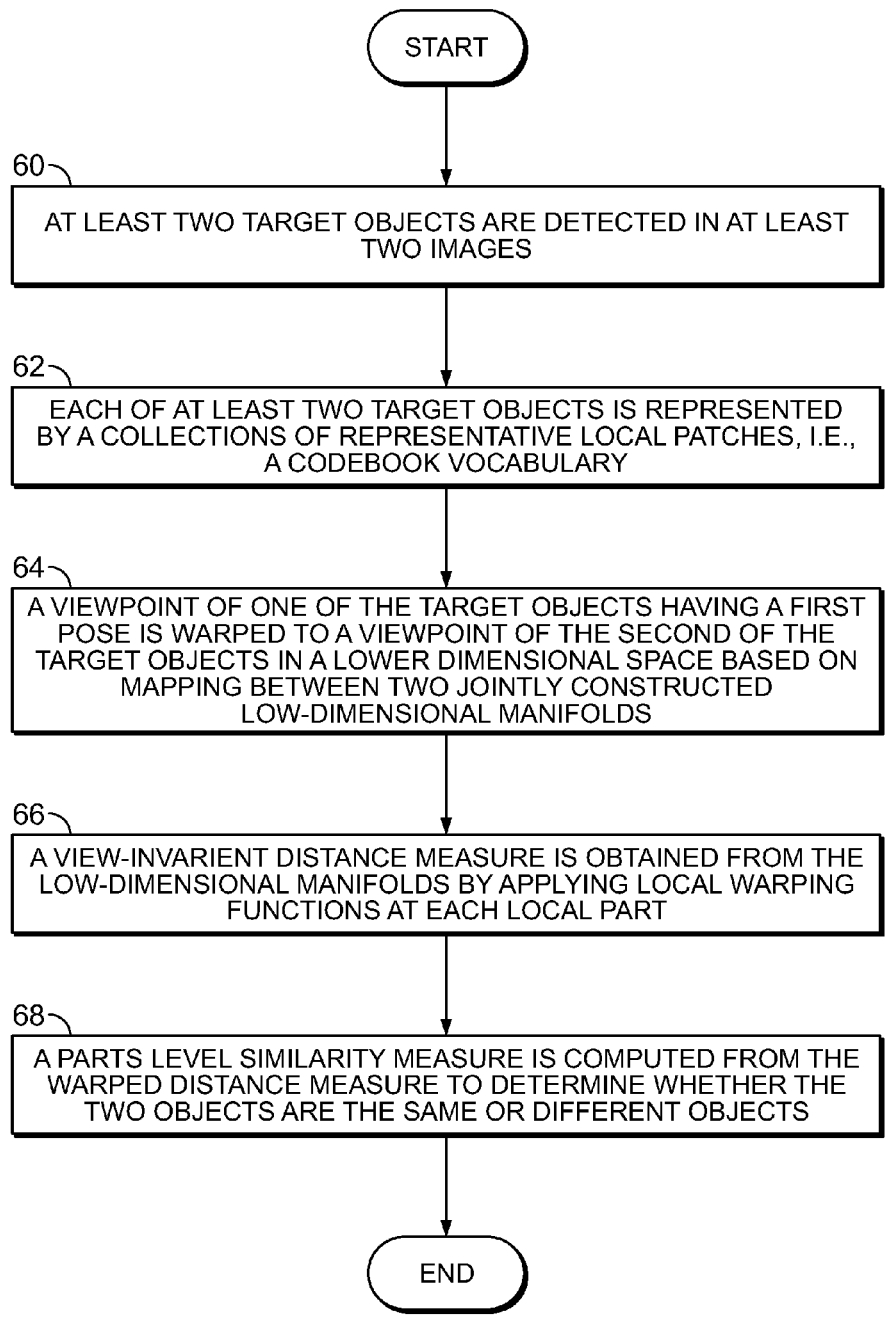
FIG. 3 is a process flow diagram illustrating exemplary steps for matching objects in a plurality of images taken by the same or different image capturing devices, according to an embodiment of the present invention.

FIG. 3 is a process flow diagram illustrating exemplary steps for matching objects in a plurality of images taken by at least one image capturing device, according to an embodiment of the present invention. At step 60, at least two target objects are detected in at least two images. At step 62, each of at least two target objects is represented by a collections of representative local patches, i.e., a codebook vocabulary. Local parts variations of the detected objects in the representative local patches are encoded with an distance-based parts encoding constructed by employing a codebook based object representation of representative object parts and their variations by type and optionally pose. At step 64, a viewpoint of one of the target objects having a first pose is warped to a viewpoint of the second of the target objects in a lower dimensional space based on mapping between two jointly constructed low-dimensional manifolds. At step 66, a view-invarient distance measure is obtained from the low-dimensional manifolds by applying local warping functions at each local part and, at step 68, a parts level similarity measure is computed from the warped distance measure to determine whether the two objects are the same or different objects. According to an embodiment of the present invention, the parts-level similarity measure may be based on a same-different classifier based on view-rectified distances for vessel fingerprinting applications.

The embodiment of the method of FIG. 3 covers the general case when a second target object in a second image undergoes an amount of change in viewpoint (pose) relative to the first target object, i.e., a change in pose above a predetermined threshold. When the amount of tilting, orientation, or zooming/scaling (i.e., the change in pose) between target objects is smaller than a predetermined threshold, a simpler embodiment of the method of the present invention may be applied to determine a match between target objects. This embodiment employs step 60 and 62, skips step 64 entirely, and employs a version of steps 66 and 68 that is reduced substantially in complexity to be described hereinbelow. When a change in pose is greater than a predetermined threshold, employing the simpler embodiment of the present invention without accounting for the change in pose causes the method to produce false matches, either positive or negative.

Step 62 of FIG. 3 provides a means to permit target objects, hereinafter described as vessels, to be comparable for later making a match determination. Vessels are best characterized by structural cues, i.e., distinctive shapes of commonly present parts, such as a prow or stern shape. While prows on different vessels may vary in appearance, there are certain common visual characteristics that render any prow as recognizable both to a computing machine and to a person. A collection of local parts of a target object in an image that captures distinctive local structure may serve as a discriminating signature for identification purposes. Such representative parts set may be utilized to form a codebook vocabulary. Each codebook comprises a set of neighborhood local patches to a distinctive anchor shape (i.e., a seed), where the distance to each codebook entry forms an embedded distance vector utilized as the part encoding.

Figures 5A, 5B:
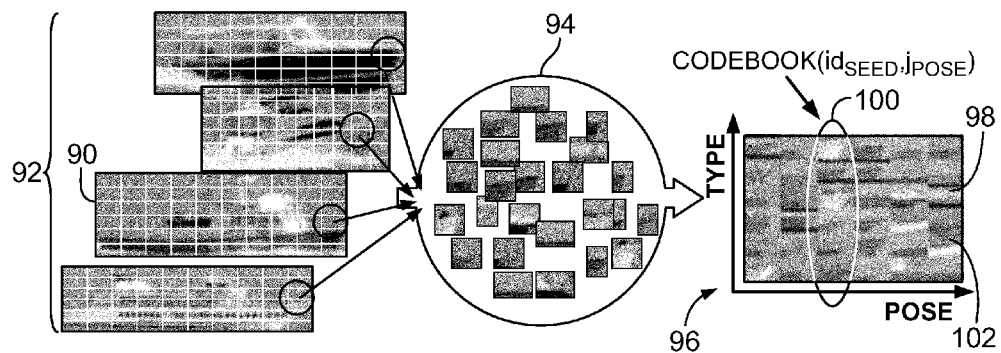

To obtain meaningful distinctive anchor shapes, a procedure known as discriminative codebook vocabulary mining is employed to produce a codebook based object representation. As the name implies, discriminative codebook vocabulary mining attempts to compose a vocabulary of instances of distinctive part type of a vessel that are often seen in various vessels. There is one codebook for each distinctive part type. FIG. 4 is a process flow diagram illustrating exemplary steps for representing target objects by a codebook vocabulary that is encoded with an embedded distance measure, i.e., step 62 of FIG. 3 in greater detail, according to an embodiment of the present invention. FIGS. 5A and 5B are diagrams illustrating a discriminative parts clustering scheme, wherein FIG. 5A depicts a local cell-based parts collection, and FIG. 5B is a graph and a set of images of a resulting vocabulary by clustering parts along type and pose space, according to an embodiment of the present invention. Referring now to FIGS. 4, 5A, and 5B, in a first step 70 of the vocabulary construction process, for the purpose of localizing parts, each vessel image 90 of a plurality of images 92 from a vessel image dataset 94 is normalized in terms of height, and then a vessel region of interest (ROI) is tessellated into coarse grid cell regions 96. At step 72, commonly seen distinctive vessel parts instances 98 from the vessel image dataset 94 may be derived from the plurality of images 92 containing the target object or from an offline set of images that may be stored in a database to form a representative local patch set 94. According to an embodiment of the present invention, sets of distinctive local parts instances are obtained in a semi-supervised manner. At step 74, image patches of the target vessel parts instances 98 that are descriptive of generic vessel shapes are extracted from the representative local patch set 94. At step 76, the patches of the representative local patch set 94 are used as seed patches to collect a more extensive set of instances of matching image patches from a larger dataset based on an image-based modified normalized cross-correlation (MNCC) similarity measure.

Each codebook vocabulary element is designed to capture shape variations of a matching vessel part. For the embedded distance feature to be discriminative as well as descriptive, at step 78, a codebook entry 102 of a code book 104 is obtained from the instances of the same seed patch from dissimilar vessel classes. For the case of image patches subject to part deformation under large pose changes, the resulting seed patches may have unacceptably distorted embedded distance vectors. In such circumstances, discriminative vocabulary mining is performed on a per seed patch type and per pose basis.

More particularly, at each local cell, dominant seed patches occurrences are found and per each seed, view-tessellated instances are gathered. That is, at each cell, $top_K$ dominant seed patches are selected from histogram of distribution of matched patch seed id that is obtained from an offline representative patch database. For each discovered seed, corresponding vessel patch instances are sorted along dimensions of vessel type and poses, where pose is divided into $n_{pose}$ intervals. Accordingly, at step 80, the extensive vessel parts collection is subsequently clustered into a codebook vocabulary of at least one plurality of codebook instances according to vessel type and pose to be described hereinbelow. If target objects of the same type have substantially the same pose (below a threshold) in the extensive vessel parts collection dataset/database, then the collection is clustered only according to vessel type. A codebook vocabulary of ($id_{seed}, i_{pose}$) may be constructed by Kmeans clustering on Histogram of Oriented Gradients (HoG) descriptors extracted from the patches at each pose interval (one in the case of a single pose) to obtain $n_{base}$ centroids. This produces a $top_K$ codebook vocabulary of $n_{pose} \times (n_{base} \times 1)$ at each cell.

Figure 6:
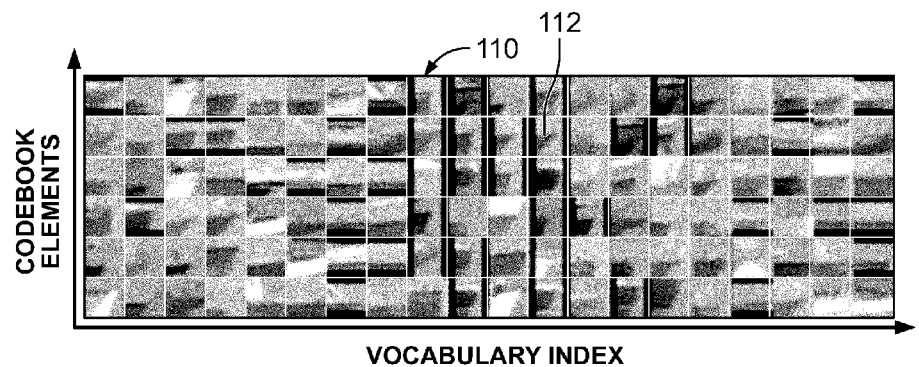
FIG. 6 shows an example of a codebook vocabulary that captures vessel frontal parts.

An example of a codebook vocabulary that captures vessel frontal parts is shown in FIG. 6. Each column 110 in FIG. 6 represents a codebook instance of, for example 6 ($=n_{base}$) elements 112 where each element 112 matches an anchor shape. For example, there is one codebook for the stern, prow, etc., i.e., for each vessel distinctive part type, and for each pose per part type.

Since for each vessel there is an aggregation of distinctive part types, and likewise for seed part types and poses of the codebooks of the constructed codebook vocabulary, at step 82, a distance vector is constructed for an image patch of a target vessel in each of the images to be compared with the corresponding codebook part type/pose in the constructed codebook vocabulary. The distance vector for each image patch to be compared is calculated based on the Euclidean distance between the HOG representation of the image patch and each of the vocabulary elements of a corresponding codebook in the codebook vocabulary. For example, for an image patch of a prow of one vessel to be compared, the Euclidian distance is calculated between the HOG representation of the prow image patch and each of the HOG representations of the 6 codebook variations that comprise a corresponding prow codebook in the constructed codebook vocabulary.

Figure 7:
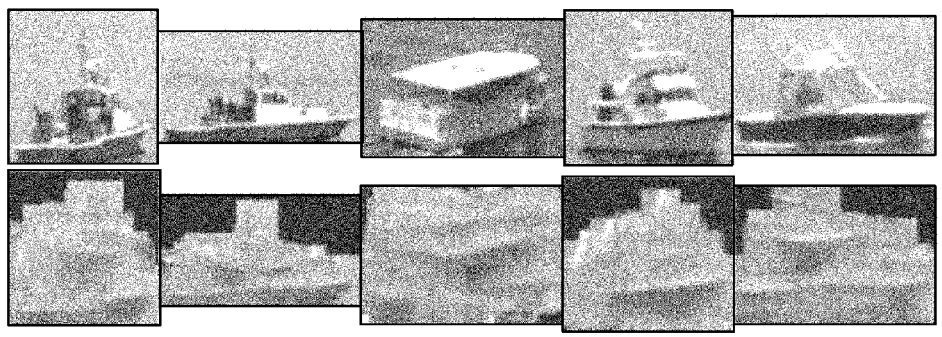
FIG. 7 illustrates correlation-based code matching, according to an embodiment of the present invention.
Figure 8B:
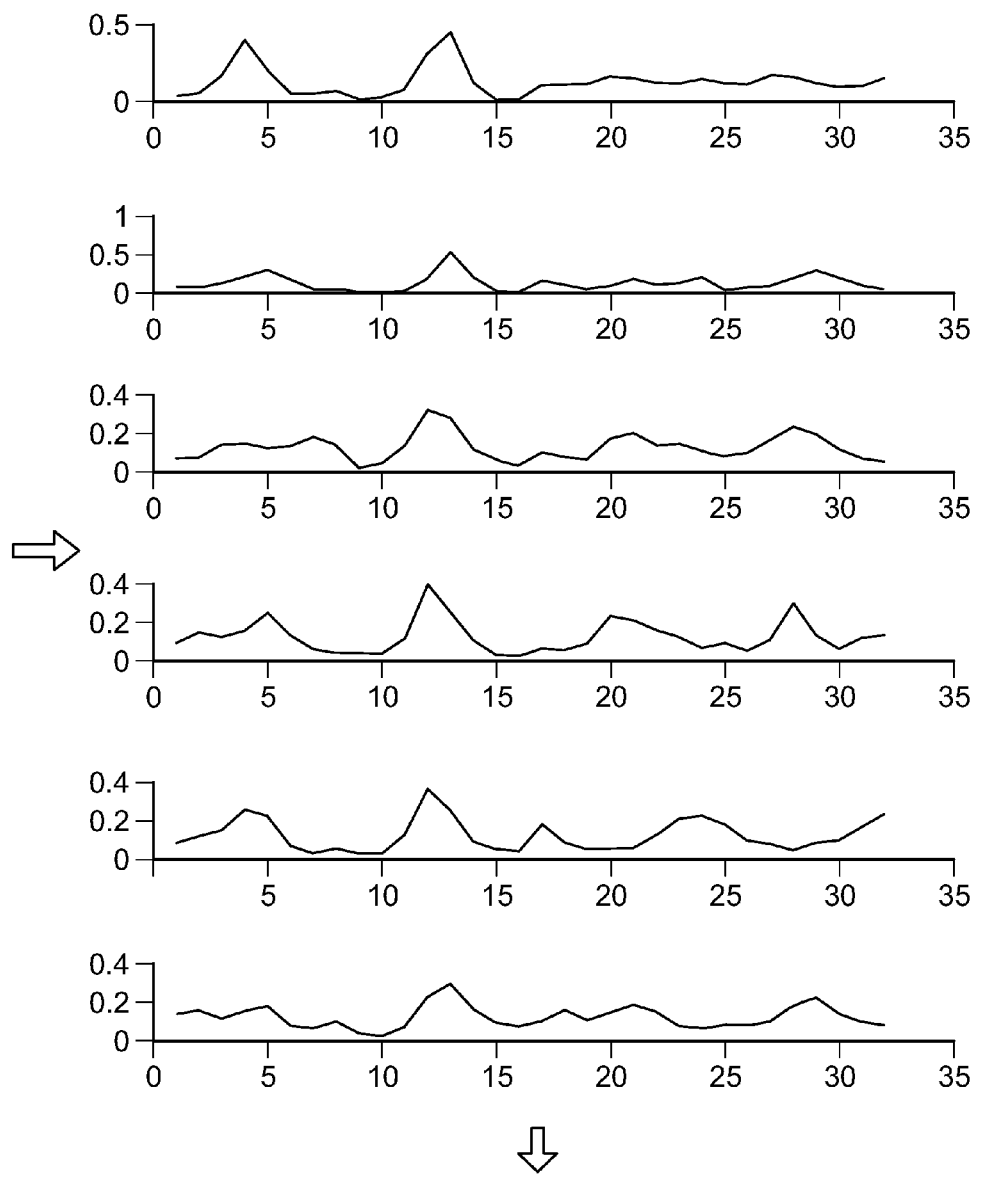
Figure 8C:
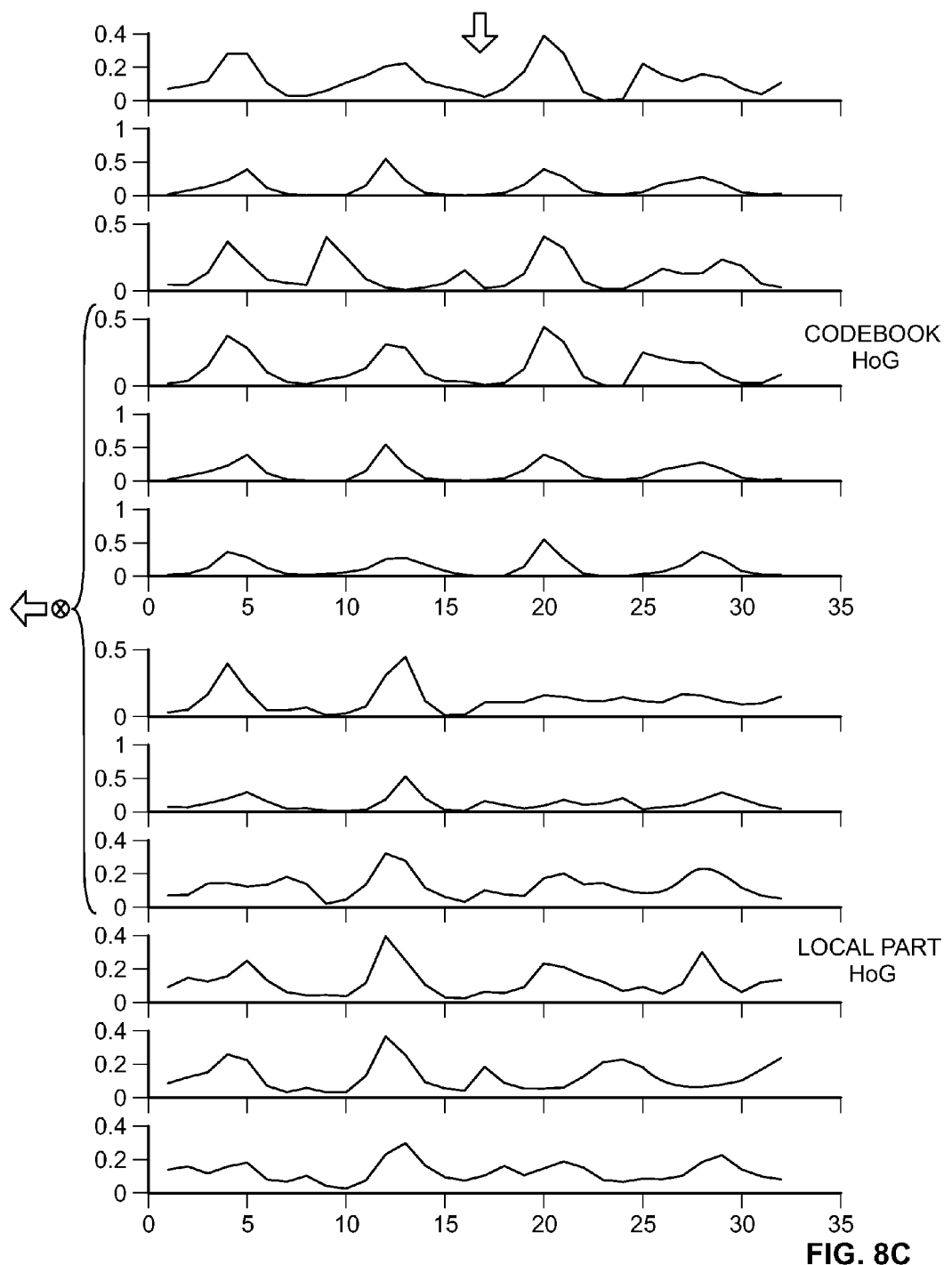

More particularly, the presence of a particular vocabulary is established by normalized cross-correlation (MNCC)-based vocabulary matching. That is, each image part in a corresponding codebook entry is matched with a local image patch to be compared by MNCC and the collective response is compared to retrieve the pose and vocabulary index ($id^{pose}$, $id_{voc}$) of a matching codebook. FIG. 7 illustrates correlation-based code matching. For each detected codebook, the detailed part variation is encoded by distance of Histogram of Oriented Gradients (HoG) descriptors between underlying parts and codebook entries. An HoG descriptor (8 directions sampled at 4×4 quadrants) provides tolerance to small pose changes, whose sampling window is localized at the maximum of correlation scores obtained from the part matching step. An encoding of a local image patch with $k_{th}$ codebook, $V_k^{Enc}$ may be expressed by $$V_k^{Enc}(I_{patch};c_i) = [d_1^H, \ldots, d_{nBase}^H]$$

$$d_i^H = f_{dist}(\text{HoG}(I_{patch}), \text{HoG}(I_i^{CB(k)})),$$

where $f_{dist}(h_1, h_2) = \Sigma^{circ}|h_1 - h_2|$ where $I_i^{CB(k)}$ denotes the $i_{th}$ image patch entry of a codebook at cell index $c_i$. $f_{dist}$ measures the distance between HoG descriptors with circular convolution of maximum one bin shift. The computational steps of encoding local vessel parts are summarized in FIGS. 8A-8D. In FIG. 8A, local parts are aligned with corresponding codebook part types/poses by MNCC. In FIG. 8B, an HoG descriptor is extracted from each local part of an image to be compared at a maximum correlation position (i.e., at an MNCC-based localized position) for each codebook entry of a corresponding codebook. In FIG. 8C, a Euclidian distance measure is computed between HoG descriptors and each codebook entry. In FIG. 8D, the individual distances are encoded into vector representations. Note that each value in $V_k^{Enc}$ encodes the similarity of the compared local patch with respect to a codebook kernel patch. Since the codebook is composed using a discriminative mining process that gathers diverse parts that diverge from a common anchor shape, the Euclidian distances may capture type-dependent variations.

More particularly, a vessel representation is based on a collection of local patch encodings, where the global distance between two vessels is computed from correlations at each cell. As each compared cell may contain different number of matched parts with disparate ids, the distance between them may be measured bi-directionally by evaluating a discrepancy at each matched codebook basis set as follows.

Assume that each compared cell $(C_e^1, C_e^2)$ in each object contains $n_i$ and $n_j$ matched codebook encodings, $\{V_i^{Enc}\}_{i \in id1}$, $\{V_j^{Enc}\}_{j \in id2}$, respectively. Then the distance between two cells, $C_{dist}(C_e^1, C_e^2)$ is computed by $$C_{dist}(C_e^1, C_e^2) = \frac{1}{n_i}\sum_{k \in id1}|V_k^{Enc}(c_i) - V_k^{Enc}(c_i)| + \frac{1}{n_j}\sum_{l \in id2}|V_l^{Enc}(c_i) - V_l^{Enc}(c_i)|$$

Under pose/viewpoint changes, the cell-based encoding $V_k^{Enc}$ incurs distortions according to parts deformation. Consequently, the similarity between matching cells of the same vessels will drop proportionally with pose disparity. Certain embodiments of the method of the present invention try to resolve the view-dependent variations so that the similarity between the same vessel types may be preserved at codebook encodings at each cell.

To perform steps 66 and 68 of FIG. 3 for the case of two target objects that have about the same pose between two images to be matched, a Euclidian sum of the distance vectors of each target image is calculated and the sums are compared to each other. If the sums are within a second predetermined threshold, then a match is declared between corresponding target objects in each image; otherwise, a non-match is declared.

As described above for step 64 of FIG. 3, when a difference in pose between two target objects in at least two images is greater than a predetermined threshold, distortions introduced by the pose differences render distance calculations between target object patches to be inaccurate. In such circumstances, two different vessels may be identified as the same vessel, or the same vessel in two images may be identified as different vessels. Therefore, it is desirable to find a method for putting patches of target objects into the same frame of reference and then carry out the same-different distance summation step 68 of FIG. 3. To put patches of target objects into the same frame of reference, a viewpoint of one target object having a first pose is warped to a viewpoint of a second target object having a second pose. To do so, it is desirable to find a one-to-one mapping function for each corresponding part of target objects to be compared which may map to an arbitrary viewpoint, known as view normalization. A warping function needs to be found for each part type/pose in a parts vocabulary through their respective distance vectors.

More particularly, according to an embodiment of the present invention, the view warping method of step 64 of FIG. 3 is designed to remove the pose-dependent intra-class variations such that similarity at each cell $C_{dist}(C_e^i, C_e^j)$ becomes preserved across different poses. For this purpose, how each patch encoding evolves in the feature space under pose changes is learned. Specifically, for each codebook encoding, $V_k^{Enc}$, its evolution of the embedded distance between different poses is learned.

To learn a warping function for a codebook encoding between two poses, instances of the embedded distance encodings and its corresponding pair $\{V_k^{Enc}(i_{pose}, c_l)\}, \{V_k^{Enc}(j_{pose}, c_l)\}$ between the same vessels in the corresponding cell region $(c_l)$ are gathered. Distance vectors for image patches of target objects can be thought of as coordinates in an n-dimensional space. However, finding the mapping function directly in high-dimensional space of F1: $\{V_k^{Enc}(i)\}$ and F2: $\{V_k^{Enc}(j)\}$ is hard to achieve due to nonlinearity in these spaces. Since part distance vectors may have a large number of elements, there may be no practically obtainable parametric matching function having a large number of dimensions.

To overcome this problem, a low-dimensional mapping function is found between two jointly constructed low-dimensional manifolds corresponding to object part distance vectors of target objects. As used herein a "manifold" is a mathematical space that on a small enough scale resembles the Euclidean space of a specific dimension, called the dimension of the manifold. Thus a line and a circle are one-dimensional manifolds, a plane and sphere (the surface of a ball) are two-dimensional manifolds, and so forth. More formally, every point of an n-dimensional manifold has a neighborhood homeomorphic to the n-dimensional space $R^n$.

More particularly, the set of $V_k^{Enc}(i_{pose})$ that is extracted from matched local parts from a target vessel dataset forms a smoothly varying compact space because (1) it is computed from local neighborhood in shape with $k_{th}$ vocabulary part, (2) under a confined pose range $(i_{pose})$ and (3) with tolerance to shape and pose variation from an HoG descriptor. As a result, the space of $V_k^{Enc}$ can be claimed to form local manifolds.

Under pose changes, local parts undergo a transformation that is approximately equivalent to affine transform, as each local patch can be reasonably approximated by a planar surface, which induces deformation in feature space. Depending on actual pose variations, the resulting deformation may either occur in the original codebook base or may be mapped to a different codebook id. However, the resulting feature space in each case will still remain a locally smooth surface. Thus, both the space of shape variations per each codebook and the transformed counterparts under viewpoint changes essentially form low-dimensional manifolds. In such circumstances, the mapping between two manifolds is equivalent to view-warping in the high dimensional space of original embedded distance encoding. This mapping is learned through a technique called local linear embedding (LLE).

LLE is a nonlinear dimensionality reduction method that produces feature spaces of reduced dimensionality while preserving a local topology of a dataset in the original space. To employ LLE, it is assumed that a lower dimensional relationship exists within lower dimensional manifolds of two part distance vectors. LLE proceeds by (1) grabbing K nearest neighborhoods for each point, (2) computing a linear reconstruction for each sample, and (3) calculating a low-dimensional manifold embedding from linear weights.

Given two high-dimensional features in correspondences each of which forms low-dimensional manifolds, local view warping is learned by joint embedding with topology constrained LLE. Although LLE may produce a faithful embedding space, it may distort global structure due to sensitivity to sampling density and noise. As a result, estimating a global mapping between two independently constructed manifolds may fail to capture an accurate warping function.

To resolve this issue, manifolds are jointly constructed that preserve global structure between the two manifolds with local topology constraints. More particularly, to resolve the issue of global structure deformation in LLE, domain knowledge is utilized such that locally, two constructed manifolds may preserve a topology up to DOF(d) for each point, where d is the dimension of the manifolds. If the innate dimensionality of the two spaces and the underlying transform between them is governed by DOF(d), such a constraint may be applied locally with the expectation that the global topology between them also to be preserved equivalent up to DOF(d). This is achieved by (1) sharing neighborhood between two spaces and (2) by putting rank(d+α) constraints on a local topology computation for each point.

Let $X_i \in F_1$ and $Y_i \in F_2$ be defined as samples in original feature space and $x_i \in f_1$ and $y_i \in f_2$ be defined as corresponding samples in low-dimensional manifolds, where $\{D_1, D_2, d_1, d_2\}$ are the dimensions of $F_1, F_2, f_1, f_2$, respectively. Here, a K nearest neighborhood of points is used for LLE, K>max($D_1$, $D_2$) and $d_1$, $d_2$<min($D_1$, $D_2$). First, a K neighborhood of points of each sample is obtained that is shared by F1 and F2, where a distance for grouping is computed between concatenated points, i.e., $[X_i, Y_i]$. Then, a rank(d+α) constraint is enforced on a local topology construction process as follows.

$$\epsilon(W_i^1) = |X_i - \Sigma_j W_j^1 X_j|$$

$$\epsilon(W_i^2) = |Y_i - \Sigma_j W_j^2 Y_j|$$

$$W^1 = M_w \times W^2, \text{rank}(M_w) = d + \alpha \quad (1)$$

Linear weight $W^1$, $W^2$ are computed in two steps. Mapping in a local topology between two space, $M_w$, may be computed by $M_{w0} = W^1 W^{2'} \text{inv}(W^2 W^{2'})$, where $M_{w0}$ is a K*K matrix. Next, a singular value decomposition (SVD) is applied to $M_{w0}$ and a rank(d+α) $M_w$ matrix is composed. Then, local weights are updated for each space by solving $$\epsilon(W_i^1) = |X_i - \Sigma_j W_j^1 X_j| + |Y_i - \Sigma_j M_w W_j^2 Y_j|$$

$$\epsilon(W_i^2) = |Y_i - \Sigma_j W_j^2 Y_j| + |X_i - \Sigma_j M_w^{-1} W_j^2 X_j|$$

The coordinate mapping in each of the manifolds may be computed by following the method described in L. K. Saul, S. T. Roweis, and Y. Singer, "Think globally, fit locally: unsupervised learning of low dimensional manifolds," *Journal of Machine Learning Research*, 4:119-155, 2003 (hereinafter "Saul et al."), by minimizing $$\sum_i \left| x_i - \sum_j w_j x_j \right|^2$$

Note that Equation 1 is an overdetermined problem as K>$D_{1,2}$ that does not return a unique solution. Thus, an additional rank(d+α) constraint may be added without changing the topology of the space if and only if the innate transformation between two local spaces is under rank(d+α). Alpha (α) is chosen to be a small constant to avoid overfitting. Once local weights are obtained for each point, embedding is computed by following the procedure describe in Saul et al.

Figure 9:
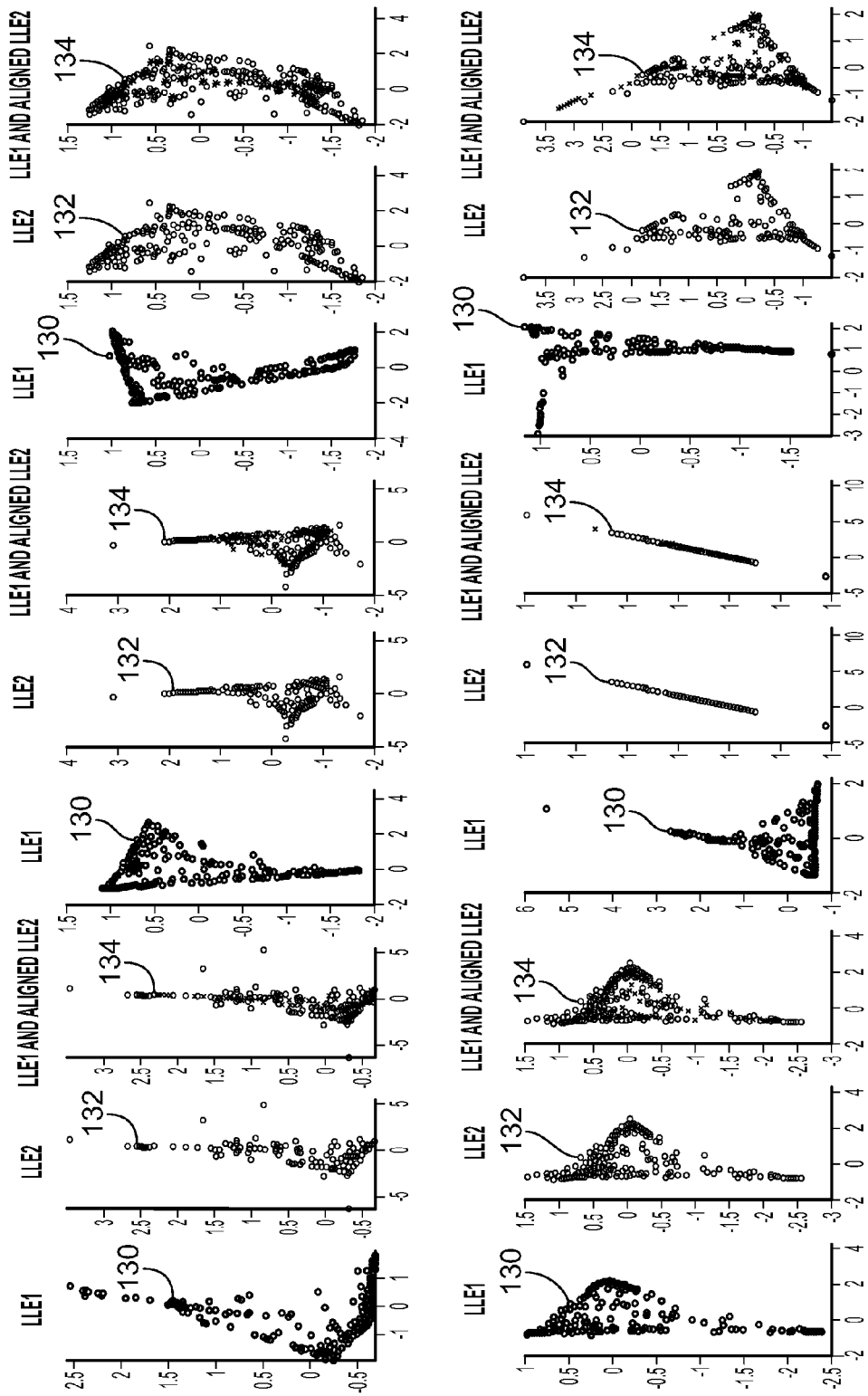
FIG. 9 displays examples of LLE construction of $F_1$ and $F_2$ for a codebook patch.

Local view warping proceeds by joint construction of low-dimensional manifolds between codebook encodings of F1: $\{V_k^{Enc}(i)\}$ and F2: $\{V_k^{Enc}(j)\}$. For example, embedded distance encodings of D=6 dimensions may form low-dimensional manifolds of (d=2, α=1) by using K=15 neighborhoods. Local view warping, i.e., mapping between two manifolds may be discovered by computing a DOF(3) affine transform from correspondences, $\{x_i, y_i\}$. FIG. 9 displays examples of LLE construction of $F_1$ and $F_2$ for a codebook patch. The first plot 130 and second plot 132 show two jointly constructed low-dimensional manifolds. From two spaces, the mapping between two manifolds may be obtained. The projection of Xi with the calculated affine transform is overlayed in the third plot 134. The effect of local topology constraints is reflected in global mapping between manifolds. The quality of the embedding and alignments varies depending on noise in feature encoding and sampling density.

Figure 10:
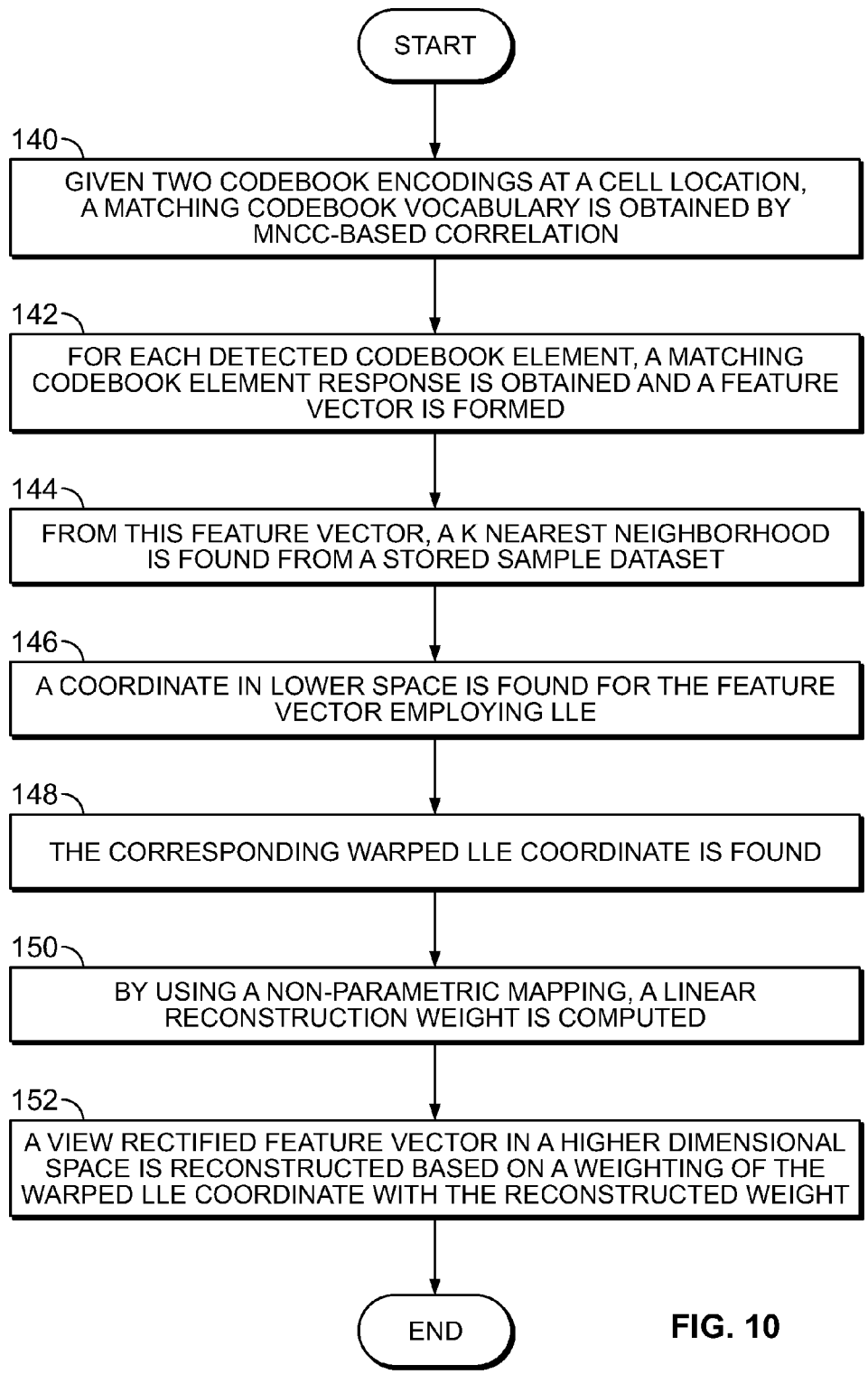
FIG. 10 is a process flow diagram illustrating exemplary steps for applying a low-dimensional warping procedure using LLE, according to an embodiment of the present invention.
Figure 11:
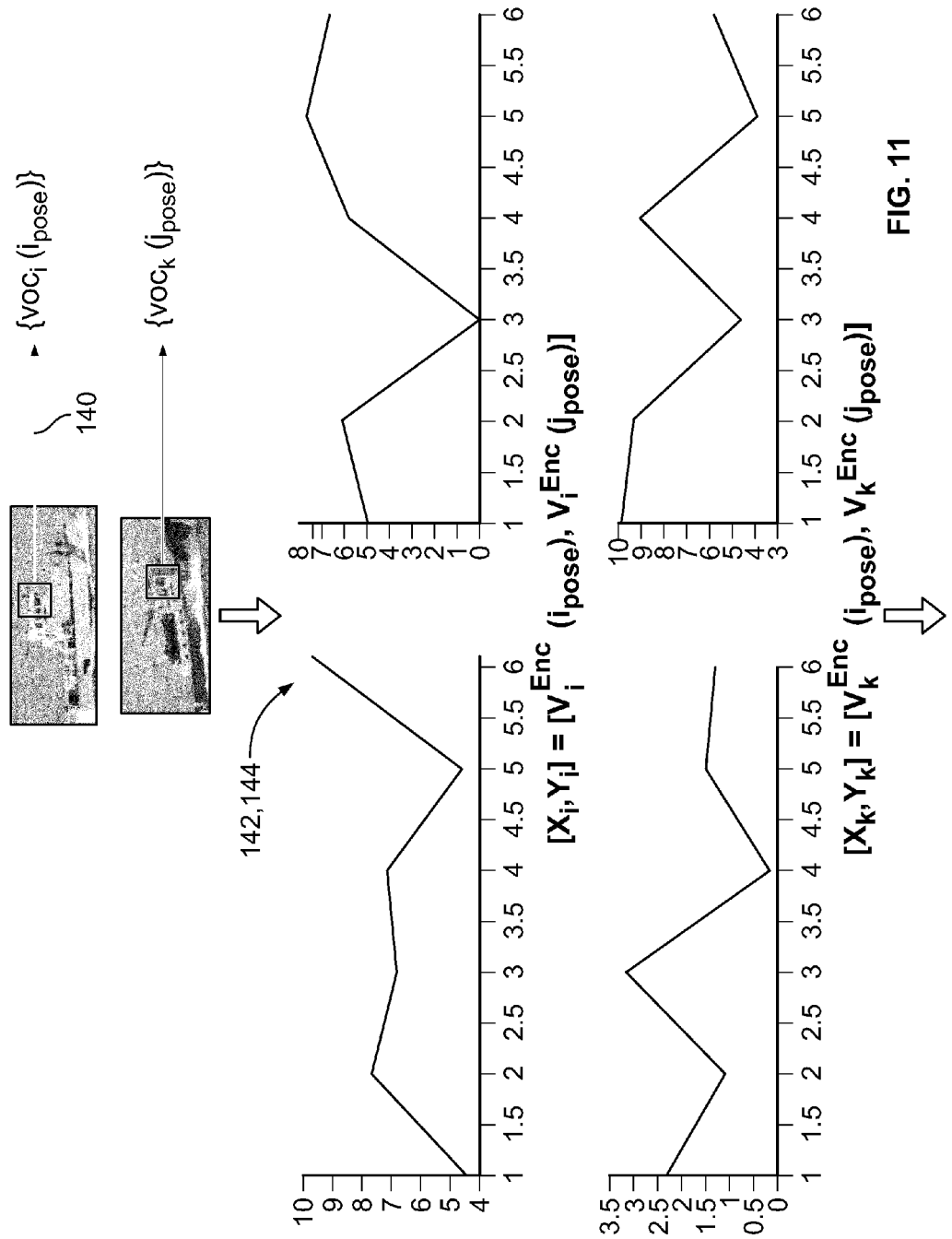
FIG. 11 is a visual display of FIG. 10.
Figure 11:
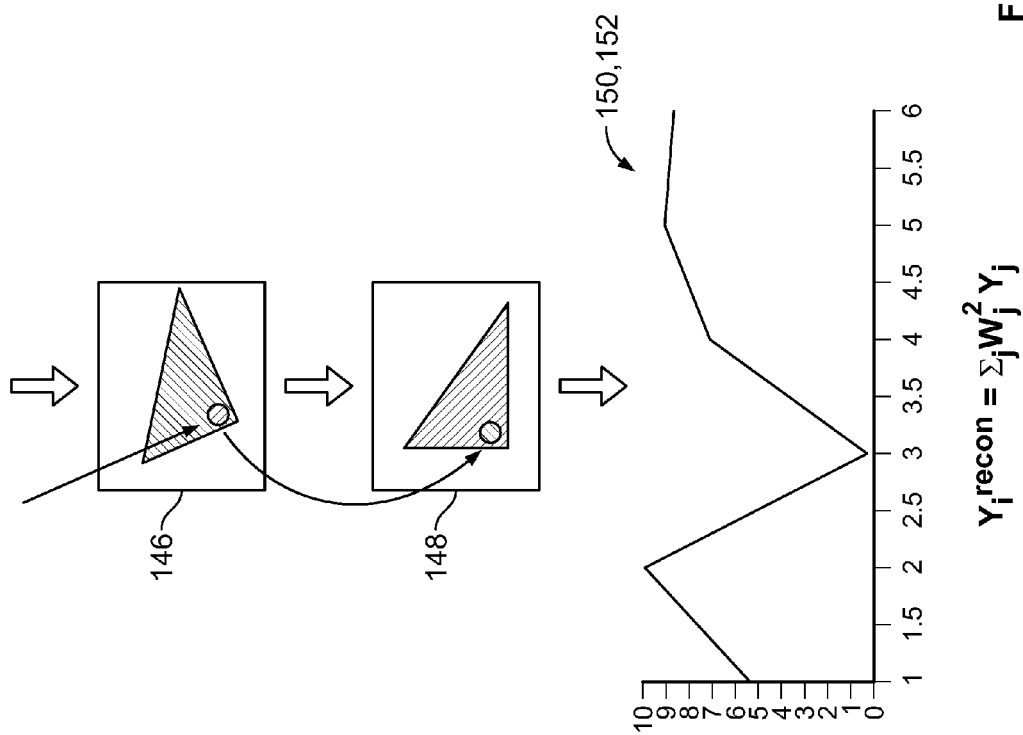

LLE-based warping comprises a nonlinear mapping and a linear construction step. Note that the mapping between feature space ($F_1, F_2$) and manifolds (f1,f2) is performs by a non-parametric mapping. For this purpose, in a preferred embodiment, about 200 samples of data for each space is selected. FIG. 10 is a process flow diagram illustrating exemplary steps for applying a low-dimensional warping procedure using LLE, according to an embodiment of the present invention. FIG. 11 is a visual display of FIG. 10. Referring now to FIGS. 10 and 11, given two codebook encodings at a cell location, at step 140, a matching codebook vocabulary is obtained by MNCC-based correlation as discussed previously. For each detected codebook element ($id_{voc}$), at step 142, a matching codebook element ($id_{voc}, i_{pose}$) response is obtained and a feature vector of $[X_i, Y_i]$ is formed. From this feature vector, at step 144, a K nearest neighborhood is found from a stored sample dataset. At step 146, a coordinate in lower space is found for the feature vector employing LLE. At step 148, the corresponding warped LLE coordinate is found. At step 150, by using a non-parametric mapping, a linear reconstruction weight $W_i^1$ is computed from Equation 1. At step 152, a view rectified feature vector in a higher dimensional space is reconstructed based on a weighting of the warped LLE coordinate with the reconstructed weight $W_i^1$.

More particularly, steps 146-152 may be expressed mathematically as follows. A linear reconstruction weight $W_i^1$ is computed from Equation 1. By using a non-parametric mapping, a corresponding $\{x_i\}$ is found and reconstructed such that $x_c (=\Sigma_i W_i^1 x_i)$. LLE learned warping on $x_c$ is employed to estimate $y_c$. Using neighborhood of $y_c, \{y_i\}$, $Y_i^{recon}$ ($=\Sigma_j W_j^2 Y_j$) is reconstructed.

The view-invariant object matching method, according to an embodiment of the present invention, the may be applied to a vessel fingerprinting problem, where the goal is to identify whether two compared vessels are identical (i.e., step 68 of FIG. 3). The simpler case wherein the poses of two target objects are about the same has already been described. In the more general case where poses may vary, of which the case of similar poses is a subset, the method proceeds by computing a view-rectified Euclidian distance, ∇distance, between compared vessel encodings according to Equation 2:

$$\nabla \text{distance} = \Sigma_i \text{diff}(f_{warp}(C_e^1(i), C_e^2(i))) \quad (2)$$

Due to variations of local distance at each cell that is induced by factors such as number of matching parts and amount of δθ pose differences, a simple global distance comparison may not be feasible. In such circumstances, a classifier based on the ∇distance of view-rectified vessel distances is trained.

Specifically, a positive training dataset is composed from the same vessel instances at different poses with Equation 2. Similarly, a negative training dataset is composed by computing ∇distance between different vessel instances. A binary support vector machine (SVM)-based classifier is trained using this dataset.

Experimental results have been obtained for view-invariant vessel matching for the vessel fingerprinting problem. In typical experimental scenarios, while observing vessel traffic from multiple monitoring cameras, the system is queried to identify a vessel id by matching it with vessel archives obtained from other cameras which are captured from different times and viewpoints.

In one experiment, vessel examples were obtained by capturing visual data from multiple viewpoints. From this data collection, 40 different vessel categories were selected where each category contains multiple observations from different viewpoints and distances. In total, 522 vessel examples were used in the experiment. The data collection contains various types of vessels such as yachts, ferries, barges, and speed boats with large variations in terms of size and scale. FIG. 12 depicts examples of vessel classes having different poses. Typical pose variation per class is around 40 deg. The data collection was divided into a training set of 17 vessel categories and a testing set of a remaining 23 categories. Each vessel region of interest (ROI) was defined manually. For the purpose of learning local view warping, vessel image sizes were normalized by resizing with respect to a fixed height of 128 pixels. Each vessel ROI was tessellated with a coarse grid 7×15 cell regions. To compose a codebook vocabulary, 325 hand-carved images examples collected from actual images were used as seed patches. Instances of local patches that match seed patches were gathered by image-based correlations (MNCC). To gauge the presence of matching parts, a low matching threshold of 0.6 (in the range of [0,1]) was used.

At each cell, a maximum of 25 (=top$_K$) dominant vocabulary part ids were collected. For each part at each cell, the matching patch sets were divided according to 4 (=n$_{pose}$) pose intervals and at each interval 6 (=n$_{base}$) centroids from Kmeans clustering were collected to gather around 2500 codebooks.

FIGS. 13A-13D shows view-rectified global vessel distances between two classes. The first three FIGS. 13A-13C show in-class distance distribution, where the error is not necessarily monotonically changing. This is because the global distance is also affected by number of matched vocabulary parts per cell. In addition, FIGS. 13A-13C show variation in terms of average distance per class. The last FIG. 13D shows the distance between different classes. FIG. 13D also shows pose-related discorrelations with decreasing distance towards frontal directions.

Figure 14:
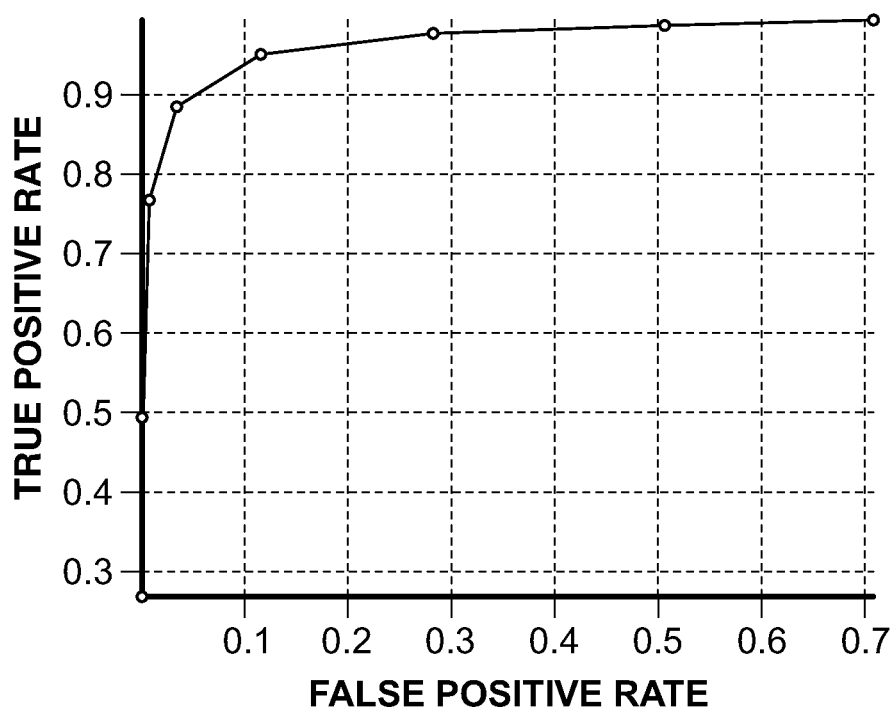
FIG. 14 is a plot of experimental vessel fingerprinting performance.

A distance-based classifier was trained based on support vector machine (SVM). For composing a positive dataset, in total 782 δdistance were collected from same vessel instances of different poses, along with a negative dataset of 1564 examples. Next, this classifier was evaluated by measuring its performance on a testing dataset. Referring now to FIG. 14, the performance of the classifier had about an 88% true positive rate and a 3% false positive rate at the trained operating point.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method for detecting similarity between objects comprising:
    detecting a first target object from a first image with a first pose and a second target object from a second image with a second pose;
    extracting a first set of patches from the first image and a second set of patches from the second image;
    mapping between the first set of patches and the second set of patches using distance measures;
    warping the first set of patches and the second set of patches locally based on the mapping to create a locally warped first set of patches and a locally warped second set of patches;
    calculating a similarity measure between the locally warped first set of patches and the locally warped second set of patches; and
    determining that a match exists between the first target object and the second target object when the similarity measure exceeds a predetermined threshold.

2. The method of claim 1, wherein the mapping comprises a set of neighborhood local patches to a distinctive shape, wherein a distance to each mapping entry forms an embedded distance vector utilized as a part encoding.

3. The method of claim 2, wherein the mapping is a subset of object representation mapping, comprising instances of distinctive part types of an object that are characteristic of objects of the same type.

4. The method of claim 3, wherein the mapping is constructed by:
    normalizing each image of an object from a plurality of images of objects in terms of height and tessellating a region of interest (ROI) of the image of the object into coarse grid cell regions;
    extracting commonly seen distinctive parts instances from the plurality of images to form a representative local patch set;
    designating patches in the representative local patch as seed patches to collect an extensive set of instances of matching image patches from a dataset based on an image-based modified normalized cross-correlation (MNCC) similarity measure; and
    clustering the extensive set of instances of matching image patches into a mapping of at least one plurality of mapping instances according to object type and pose.

5. The method of claim 4, wherein constructing the distance measures comprises the step of computing a distance vector for each of the at least one first patch and the at least one second patch based on Euclidean distance between a histogram of oriented gradients (HOG) representation of the at least one first patch and the at least one second patch and vocabulary elements of a corresponding mapping entry.

6. The method of claim 1, wherein the mapping is a mapping between two jointly constructed low-dimensional manifolds to obtain a view-invariant distance measure in a lower dimensional space.

7. The method of claim 6, wherein the mapping between two jointly constructed low-dimensional manifolds is learned through local linear embedding (LLE).

8. The method of claim 7, further comprising the steps of:
detecting at least one matching mapping entry for each patch from the first set of patches and at least one second patch;
for each matching mapping entry, obtaining a matching entry response and forming a feature vector; and
for each formed feature vector,
obtaining a K nearest neighborhood from a stored sample dataset;
determining a coordinate in a lower-dimensional space using LLE;
determining a warped LLE coordinate corresponding to the coordinate in the lower-dimensional space;
computing a linear reconstruction weight using a non-parametric mapping; and
reconstructing a view rectified feature vector in a higher dimensional space based on a weighting of the warped LLE coordinate with the reconstructed weight.

9. The method of claim 1, wherein the determining whether a match exists is based on a parts-level similarity measure, computed from a warped distance measure.

10. The method of claim 9, wherein the parts-level similarity measure is based on a same-different classifier and on view-rectified distances.

11. An apparatus for matching objects comprising:
an image capture device for detecting a first target object from a first image with a first pose and a second target object from a second image with a second pose, wherein difference between the first pose and second pose is greater than a predetermined threshold; and
a processor for extracting a first set of patches from the first image and a second set of patches from the second image, mapping between the first set of patches and the second set of patches using distance measures, warping a viewpoint of the first pose to a second viewpoint of the second pose based on the mapping and warping the first set of patches and the second set of patches locally to create a locally warped first set of patches and a warped second set of patches and determining that a match exists between the first target object and the second target object when a similarity measure is calculated between the locally warped first set of patches and the locally warped second set of patches and exceeds a predetermined threshold.

12. The apparatus of claim 11, wherein the mapping comprises a set of neighborhood local patches to a distinctive shape, wherein a distance to each mapping entry forms an embedded distance vector utilized as a part encoding.

13. The apparatus of claim 12, wherein the mapping is a subset of object representation mapping, comprising instances of distinctive part types of an object that are characteristic of objects of the same type.

14. The apparatus of claim 13, wherein the mapping is constructed by:
normalizing each image of an object from a plurality of images of objects in terms of height and tessellating a region of interest (ROI) of the image of the object into coarse grid cell regions;
extracting commonly seen distinctive parts instances from the plurality of images to form a representative local patch set;
designating patches in the representative local patch as seed patches to collect an extensive set of instances of matching image patches from a dataset based on an image-based modified normalized cross-correlation (MNCC) similarity measure; and
clustering the extensive set of instances of matching image patches into a mapping of at least one plurality of mapping instances according to object type and pose.

15. The apparatus of claim 14, wherein constructing distance measures comprises the step of computing a distance vector for each of the at least one first patch and the at least one second patch based on Euclidean distance between a histogram of oriented gradients (HOG) representation of the at least one first patch and the at least one second patch and vocabulary elements of a corresponding mapping entry.

16. The apparatus of claim 11, wherein the mapping is a mapping between two jointly constructed low-dimensional manifolds to obtain a view-invariant distance measure in a lower dimensional space.

17. The apparatus of claim 16, wherein the mapping between two jointly constructed low-dimensional manifolds is learned through local linear embedding (LLE).

18. The apparatus of claim 17, wherein the processor is further for:
detecting at least one matching mapping entry for each patch from the first set of patches and at least one second patch;
for each matching mapping entry, obtaining a matching entry response and forming a feature vector; and
for each formed feature vector,
obtaining a K nearest neighborhood from a stored sample dataset;
determining a coordinate in a lower-dimensional space using LLE;
determining a warped LLE coordinate corresponding to the coordinate in the lower-dimensional space;
computing a linear reconstruction weight using a non-parametric mapping; and
reconstructing a view rectified feature vector in a higher dimensional space based on a weighting of the warped LLE coordinate with the reconstructed weight.

19. The apparatus of claim 11, wherein the determining whether a match exists is based on a parts-level similarity measure, computed from a warped distance measure.

20. The apparatus of claim 19, wherein the parts-level similarity measure is based on a same-different classifier and on view-rectified distances.

* * * * *